No. 617,616. Patented Jan. 10, 1899.
J. & W. R. THOMAS.
VALVE.
(Application filed June 22, 1898.)
(No Model.)

WITNESSES

INVENTORS
James Thomas
William R. Thomas

THE NORRIS PETERS CO., PHOTO-LITHO., WASHINGTON, D. C.

UNITED STATES PATENT OFFICE.

JAMES THOMAS AND WILLIAM R. THOMAS, OF CATASAUQUA, PENNSYLVANIA.

VALVE.

SPECIFICATION forming part of Letters Patent No. 617,616, dated January 10, 1899.

Application filed June 22, 1898. Serial No. 684,149. (No model.)

*To all whom it may concern:*

Be it known that we, JAMES THOMAS and WILLIAM R. THOMAS, citizens of the United States, residing at Catasauqua, in the county of Lehigh and State of Pennsylvania, have invented certain new and useful Improvements in Valves; and we do hereby declare the following to be a full, clear, and exact description of the invention, such as will enable others skilled in the art to which it appertains to make and use the same.

Our invention relates to improvements in valves, and more particularly to that class of valves known as "gate-valves."

It consists in providing a valve with a suitable casing having a valve-seat and rockers adapted to engage bearings upon one of the faces of the valve for pressing the valve evenly against the valve-seat and means for moving the valve back and forth upon the seat.

It also consists in providing a valve having a suitable casing with a valve-seat and tapering overhanging guides for directing the valve in its movement and causing the same to form a tight joint when closed and means for moving the valve back and forth upon the valve-seat.

It also consists in certain other novel constructions, combinations, and arrangement of parts, as will be hereinafter more fully described and claimed.

Figure 1:
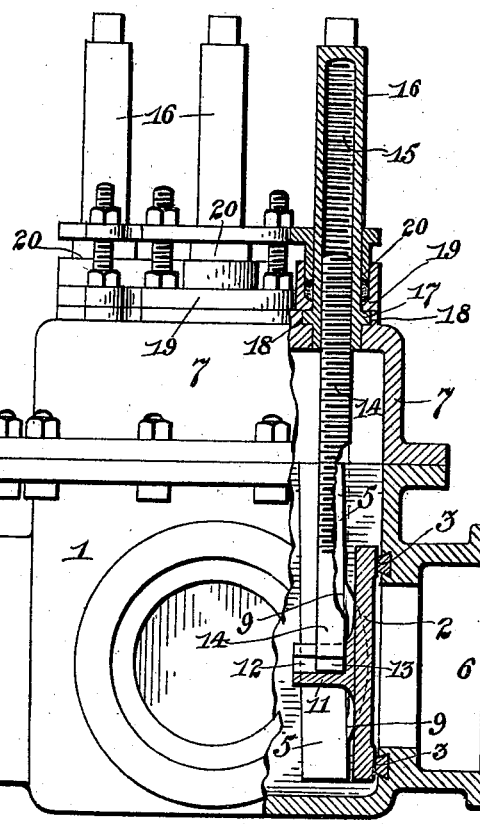
Figure 3:
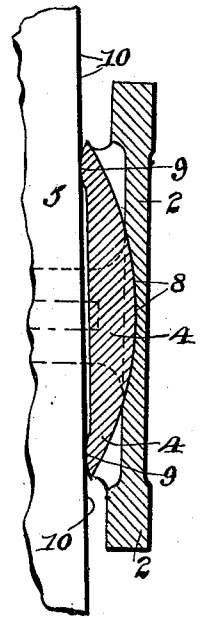
Figure 2:
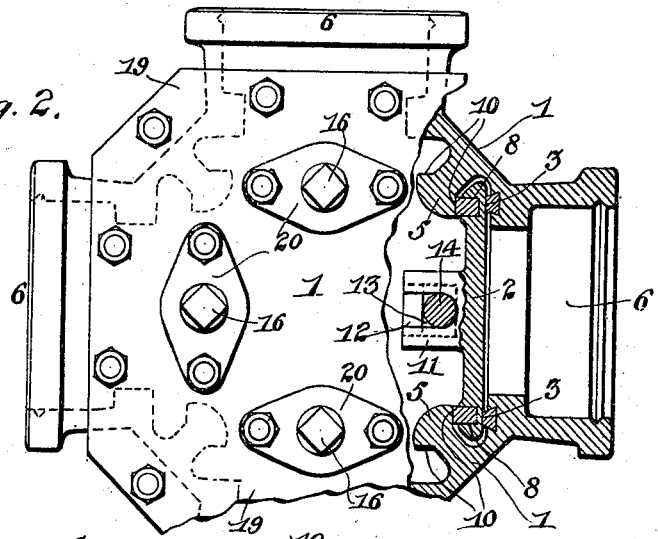
Figure 4:
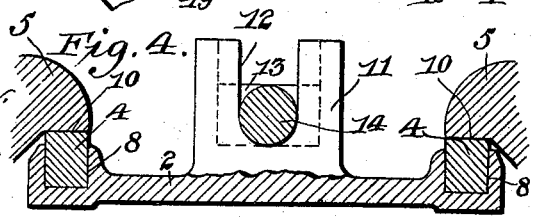

In the accompanying drawings, Figure 1 represents a side elevation of a valve constructed in accordance with our invention, parts of said valve being shown in section to better reveal the parts. Fig. 2 represents a top plan view of the said valve, portions being broken away and sectioned to show the overhanging guides for holding the valve in place. Fig. 3 represents an enlarged detail view of the valve, showing one of the rockers for holding the said valve to its seat; and Fig. 4 represents an enlarged detail sectional view showing the valve and the rockers for holding it in place.

In the accompanying drawings, 1 represents a valve-casing; 2, a valve; 3, a valve-seat; 4, rockers; and 5 guides for directing the movement of the valve.

A valve constructed in accordance with our invention is well adapted for use upon large pipes and mains and may be a single valve or may be manufactured as a valve having two or more gates for connecting up different mains or pipes.

We have illustrated in the drawings a valve-casing suitable for holding four valves and for controlling communication with four different pipes or mains. It will be apparent that the construction of a single valve employing a single gate will have its gate constructed in all particulars the same as the gate shown in the drawings. The main part of the casing 1 is preferably cast in suitable shape and provided with various ports, as 6 6, adapted to be connected with the pipes or mains in any usual and well-known manner. Around the ports 6 6, interiorly of the casing 1, are arranged the valve-seats 3, which may be, as shown in the drawings, dovetailed in place to hold them snugly in the casing. The valve-casing 1 is provided with a removable top, as 7, which is preferably formed with a bolting-flange adapted to engage a corresponding bolting-flange formed upon the main casing 1, so that after the parts of the valve are in place the cap may be bolted in position to close the valve-box. The valve slide or gate 2 is preferably made of an approximately flat shape and is provided with a slightly-raised portion around its periphery to engage the valve-seat 3. Near each side of the valve two segmental recesses, as 8, are formed, into which fit rockers, as 4, the said rockers having a curved surface to fit accurately the segmental recesses 8 upon one side and upon the other side being provided with bearing-faces near their ends, as at 9 9, to engage guides mounted in the casing 1. The guides 5 are preferably cast integral with the casing 1 and are formed with overhanging bearing-faces 10 10, which extend over the edges of the valve 2 and engage bearing-surfaces 9 of the rockers 4. As seen in Fig. 1 of the drawings, the guides 5 are preferably set at a slight inclination to the surface of the valve-seats 3, so that when a valve is pushed upon the seat so as to close the port 6 the guides will wedge the valve, through the medium of the rockers, tightly against the said valve-seat. In order to slide the valve 2 back and forth upon its seat, a central stud or projection, as 11, is formed upon the inner surface of the valve 2, the said stud being provided with a recess, as 12, adapted to receive a head 13, formed upon the inner end of an operating-screw, as 14. The screw 14 is made of sufficient length to project through the cap 7 when the valve is closed and engage a threaded socket, as 15, formed in a suitable valve-stem, as 16. The valve-stem 16 is so formed as to have no longitudinal movement in the casing of the valve, and for this purpose is preferably provided with an annular rib or projection, as 17, which engages a corresponding annular seat or recess, as 18, formed in the cap 7. A cap-plate, as 19, is then secured in place upon the cap 7, so as to confine the annulus 17 in the seat 18. In order to prevent any leakage from the valve-casing through the cap and cap-plate, I preferably place a suitable packing-gland, as 20, around the stem 16, as clearly illustrated in the drawings. The outer end of the valve-stem 16 is preferably squared, as seen in Fig. 2, in order that it may be engaged by any suitable handle, key, or wrench for turning the same. When a key is applied to the stem 16 and it is rotated, the threads of the socket 15, engaging the threads of the valve-screw 14, will draw the valve off from the seat 3 and open the port 6. When it is desired to close the valve again, the valve-stem is turned in the opposite direction, which would force the screw inwardly, causing the valve to move back to its place upon the seat 3, and in this movement it is guided by the rockers engaging the overhanging faces 10 of the guides 5. The rockers will adjust themselves so as to bear evenly upon the valve and cause it to have an even bearing upon the valve-seat. Because of the taper of the guides 5 the valve will be more or less wedged in place upon its seat, so as to form a snug joint, which will not leak. The rockers for producing an even pressure upon the valve form an important feature of our invention, as also the tapering guides which overhang the valve and hold the same upon its seat.

It will be apparent where the valve-casing contains more than one gate—as, for instance, a valve like the one shown in the drawings—that all of the gates and their rockers and guides can be made precisely alike. It is also preferable when using a valve with more than one gate to cast the guides in such a manner as to have two overhanging bearing-surfaces adapted to overhang and engage the two adjoining edges of adjoining valves. This is clearly seen in Fig. 2 of the drawings.

It will be very evident from this description that a valve constructed in accordance with this invention is simple in construction and yet capable of being closed tightly against almost any pressure.

Having now described our invention, what we claim as new, and desire to secure by Letters Patent, is—

1. In a gate-valve, the combination with a suitable casing, of a valve-seat formed therein, a valve adapted to engage said seat, and rockers interposed between the said valve and portions of the casing for holding the valve firmly against the seat when in its closed position, substantially as described.

2. In a valve, the combination with a casing, of a valve-seat and a valve adapted to engage the same, and guides comprising web portions and head portions having one or more bearing-faces overhanging the edges of the said valve and adapted to wedge the same upon its seat when closed, substantially as described.

3. In a valve, the combination with a suitable casing, of a valve-seat formed therein, a valve adapted to move upon the seat, the said valve being provided with segmental recesses, rockers adapted to engage the said recesses, and guides upon the casing for engaging the rockers, the construction being such that as the valve is moved to its seat, the rockers will exert an even pressure to hold the valve snugly upon its seat, substantially as described.

4. In a valve, the combination with a casing and a valve-seat, of a valve adapted to move thereon, rockers adapted to engage the valve upon one side and guides upon the other, and guides overhanging the edges of the valves and adapted to engage the rockers so as to wedge the valve tightly upon its seat with an even pressure, substantially as described.

5. In a valve, the combination with a suitable casing, and a valve-seat, of a valve adapted to slide thereon, rockers adapted to engage the said valve and overhanging guides adapted to engage the rockers, said guides being set at a slight angle to the face of the valve-seat, whereby the valve will be wedged tightly against the valve-seat when closed, substantially as described.

6. In a valve, the combination with a valve-seat, of a valve or gate adapted to move thereon, overhanging guides for guiding the valve upon the seat, a central projection or stem formed upon the valve and having a recess, and a valve-screw adapted to engage the said recess at one end and extending through the casing so as to engage a valve-stem at the other end, the construction being such that when the valves are turned the screw will move the valve or gate back and forth upon its seat, substantially as described.

7. In a gate-valve, the combination with a casing and a seat, of a valve or gate moving thereon, the said valve having segmental recesses formed near its opposite edges, segmental rockers mounted in the said recesses, overhanging guides formed in the casing and adapted to bear upon the flat faces of the said rockers and means for moving the valve back and forth upon the valve-seat, the construction being such that the rockers will hold the valve or gate upon its seat with an even pressure, substantially as described.

8. In a valve, the combination with a valve-seat, of a valve-gate adapted to move thereon, means for holding the said valve to its seat, and means for moving the valve comprising an operating-screw and a valve-stem, said screw engaging the valve at one end and at its other end extending into a screw-threaded socket formed in the valve-stem, an annular projection formed upon the valve-stem and engaging a suitable packing-box upon the valve-casing whereby the stem can be rotated for moving the operating-screw but will not move longitudinally, substantially as described.

In testimony whereof we hereunto affix our signatures in presence of two witnesses.

JAMES THOMAS.
WILLIAM R. THOMAS.

Witnesses:
R. T. DAVIES,
PATRICK MCNALLY.